United States Patent [19]
Oka et al.

[11] Patent Number: 6,146,029
[45] Date of Patent: Nov. 14, 2000

[54] MAGAZINE MOUNTING DEVICE FOR PHOTOGRAPHIC PROCESSING SYSTEM AND MAGAZINES SUITED THERETO

[75] Inventors: Teruhito Oka, Kainan; Yoshihisa Higashimoto, Katsuragi-cho; Junichi Yamamoto, Yuasa-cho, all of Japan

[73] Assignee: Noritsu Koki Co., Ltd., Wakayama-ken, Japan

[21] Appl. No.: 09/328,734

[22] Filed: Jun. 9, 1999

[30] Foreign Application Priority Data

Jun. 12, 1998 [JP] Japan ................... 10-165504

[51] Int. Cl.[7] .................................................. G03D 3/08
[52] U.S. Cl. .............................................................. 396/612
[58] Field of Search .................................. 396/598, 599, 396/612, 617, 620; 242/348, 538, 538.3, 538.4

[56] References Cited

FOREIGN PATENT DOCUMENTS

| 0628854 | 5/1994 | Japan . |
| 0672937 | 3/1995 | Japan . |
| 0867758 | 9/1998 | Japan . |

*Primary Examiner*—D. Rutledge
*Attorney, Agent, or Firm*—Jordan and Hamburg LLP

[57] ABSTRACT

In a magazine mounting device for a photographic processing system, first and second magazines each have a reel shaft for holding a roll of printing paper and first to fourth side walls, and the distance between the first and third side walls is made approximately equal to the distance between the second and fourth side walls. The first and second magazines are mounted in first and second magazine mounting unit, respectively, in such a way that a printing paper outlet formed in the first magazine and a printing paper outlet formed in the second magazine are oriented at right angles to and situated close to each other.

7 Claims, 4 Drawing Sheets

15 # MAGAZINE MOUNTING DEVICE FOR PHOTOGRAPHIC PROCESSING SYSTEM AND MAGAZINES SUITED THERETO

BACKGROUND OF THE INVENTION AND RELATED ART STATEMENT

This invention relates to magazines for holding light-sensitive material (photographic printing paper) in a photographic processing system which is used in a photofinishing laboratory, for instance, as well as to a magazine mounting device capable of mounting a pair of magazines.

FIG. 4 generally shows the construction of a conventional photographic processing system 1 on which a pair of magazines 6, 6' containing printing paper can be mounted. The printing paper 10 is wound in rolls and stored in the individual magazines 6, 6'. These two dedicated magazines 6, 6' can be mounted on top of the photographic processing system 1 as illustrated. Slit-like printing paper outlets are formed in the individual magazines 6, 6'. An unrolled portion of the printing paper 10 pulled out through the printing paper outlet of one of the magazines 6, 6' into a dark chamber 2 is advanced by a feed mechanism including a feed roller 7 and cut to a specified size by a cutter 4. Cut pieces of the printing paper 10 are then transferred toward an exposure table 3.

The exposure table 3 is arranged in such a way that it makes an approximately 45-degree angle with the floor and an enlarger lens unit 20 is installed such that the optical axis L of an enlarger lens is oriented at right angles to the exposure table 3, or forms an angle of about 45 degrees with the floor in a direction opposite to the sloping direction of the exposure table 3. A light source 11, which is associated with a mirror unit 12, is so installed that it projects a light beam generally at right angles to the optical axis L of the enlarger lens unit 20.

Although not illustrated, there is provided a film transport mechanism for advancing a negative film between the light source 11 and the enlarger lens unit 20. There are also provided such facilities as an operator panel 13 and a monitor display 14 near the light source 11 and the enlarger lens unit 20.

After exposure, the individual cut pieces of the printing paper 10 are transferred to a developer unit 30 by a transport mechanism 5 which includes a belt. Then, the cut pieces undergo developing, bleaching, fixing, stabilizing and drying processes and are finally discharged to a top part of the photographic processing system 1.

In general, the two magazines 6, 6' have the same shape and are aligned in the same direction when installed in conventional photographic processing systems. In this general construction, there can be a considerable difference between the distance from the printing paper outlet in the left-hand magazine 6 to the feed roller 7 and that from the printing paper outlet in the right-hand magazine 6' to the feed roller 7, depending on the location of the feed roller 7, as can be seen from FIG. 4. It follows that the size of the dark chamber 2 of the photographic processing system 1 must be increased according to an increase in the distance from the printing paper outlet in one of the magazines 6, 6' to the feed roller 7, and this has been a major factor that has made it impossible to reduce overall dimensions of the photographic processing system 1.

One approach to making the distance from the printing paper outlet in the left-hand magazine 6 to the feed roller 7 approximately equal to that from the printing paper outlet in the right-hand magazine 6' to the feed roller 7 is to make the two magazines 6, 6' in different shapes. This approach will, however, cause a loss of interchangeability of the magazines 6, 6' and some complexity in their storage and inventory control. Further, this approach will lessen economies of scale in manufacturing, thereby increasing their production costs.

Another approach to making the distance from the printing paper outlet in the left-hand magazine 6 to the feed roller 7 approximately equal to that from the printing paper outlet in the right-hand magazine 6' to the feed roller 7 would be to shift the location of the two magazines 6, 6' rightward, as illustrated in FIG. 4. However, since the magazines 6, 6' will be mounted on top of the developer unit 30 in this second approach, removal of a top cover of the developer unit 30 for servicing an upper portion of the developer unit 30 will become difficult. Thus, this approach can cause degradation in the serviceability of the developer unit 30.

SUMMARY OF THE INVENTION

In view of the aforementioned problems of the prior art, it is an object of the invention to provide such a magazine mounting device for a photographic processing system that can accommodate two magazines of the same shape, make the distance from a printing paper outlet in one magazine to a feed roller of a printing paper transport mechanism approximately equal to that from a printing paper outlet in the other magazine to the feed roller, and reduce overall dimensions of the photographic processing system. It is another object of the invention to provide magazines suited to the magazine mounting device.

To fulfill the above objects according to this invention, a magazine mounting device for a photographic processing system is so constructed that two magazines containing a light-sensitive material and having generally the same shape can be mounted in such a way that light-sensitive material outlets formed in the magazines are oriented in different directions and the distance from the light-sensitive material outlet of one magazine to a drive roller for advancing the light-sensitive material is approximately equal to the distance from the light-sensitive material outlet of the other magazine to the drive roller.

Since the distance from the light-sensitive material outlet of one magazine to the drive roller is substantially the same as that from the light-sensitive material outlet of the other magazine to the drive roller in this construction, it is possible to minimize dead space taken by the magazine mounting device, a light-sensitive material transport mechanism and other associated mechanism in the photographic processing system and thereby reduce its overall dimensions.

These and other objects, features and advantages of the invention will become more apparent upon a reading of the following detailed description in conjunction with the accompanying drawings.

DETAILED DESCRIPTION OF THE PREFERRED EMBODIMENTS OF THE INVENTION

First Embodiment

Figure 1:
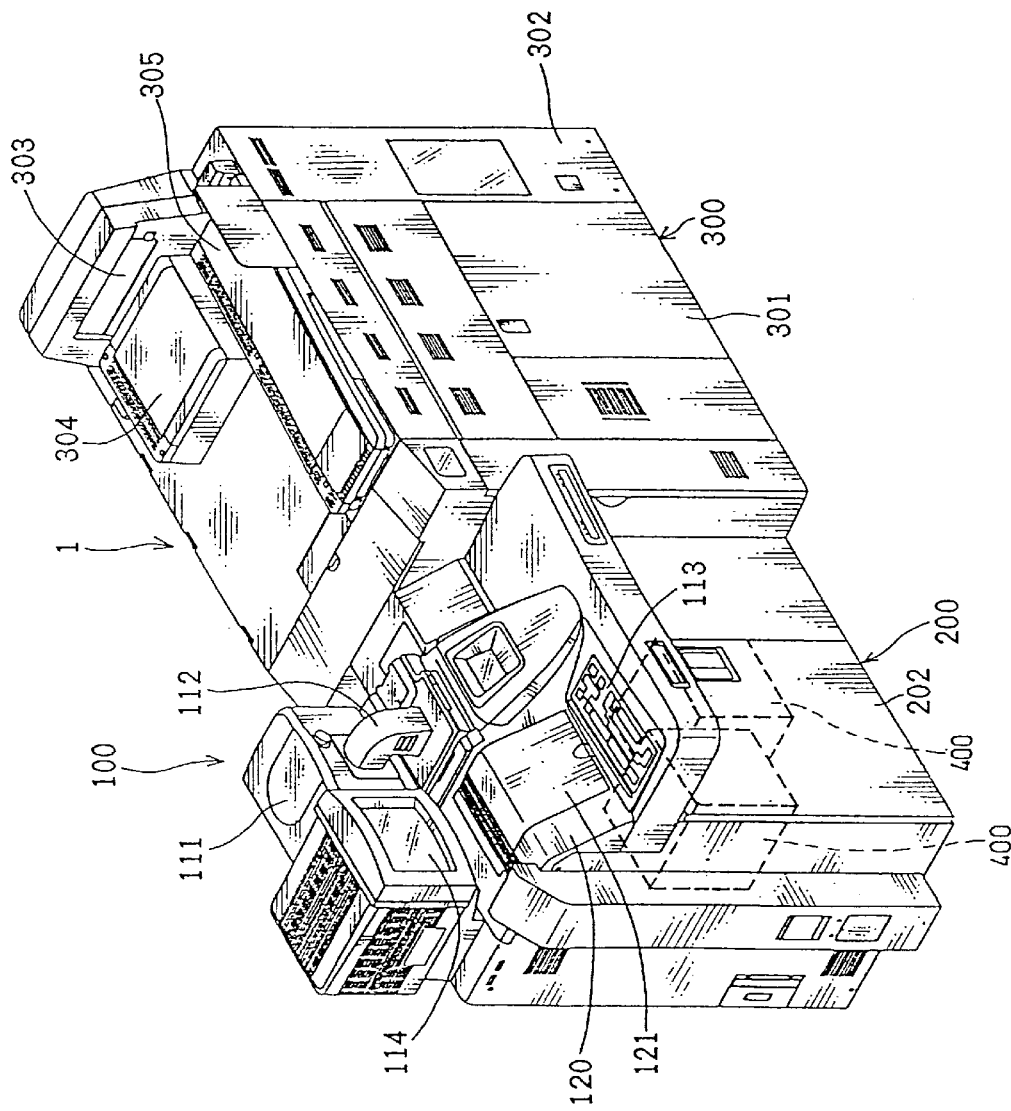
FIG. 1 is a perspective diagram showing the external appearance of a photographic processing system according to a first embodiment of the invention.
Figure 2:
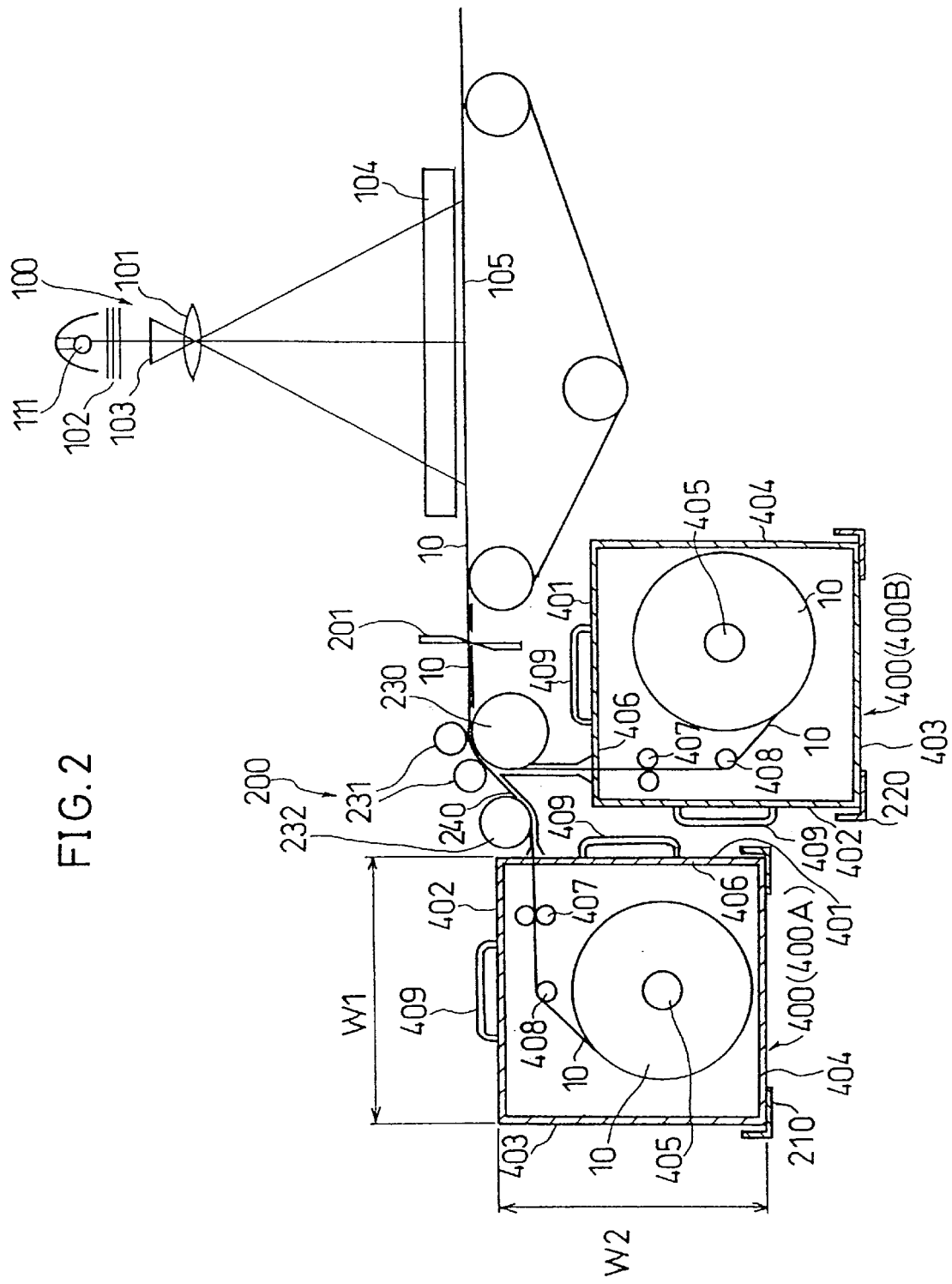
FIG. 2 is a diagram showing the construction of an exposure unit, a magazine mounting device and magazines.

A first embodiment of the invention is now described referring to FIGS. 1 and 2.

FIG. 1 is a perspective diagram showing the external appearance of a photographic processing system 1 according to the first embodiment of the invention. The photographic processing system 1 comprises an exposure unit 100 which projects an enlarged optical image of each frame of a film on printing paper to expose it, a magazine mounting device 200 which accommodates magazines 400 containing rolls of printing paper, pulls out the printing paper out of the magazines 400 and cuts it to a specified size and feeds cut pieces of the printing paper to the exposure unit 100, and a developer unit 300 develops, bleaches, fixes, stabilizes and dries the individual cut pieces of the printing paper exposed in the exposure unit 100.

Located below or at the side of the exposure unit 100, the magazine mounting device 200 can accommodate two magazines 400 each containing a roll of printing paper in a manner that it will not be exposed. Since each web of unused rolled printing paper is about 180 m long, for example, each magazine 400 loaded with the printing paper can be as heavy as about 14 kgs. Thus, there are provided telescopic guide rails (not shown) on the inside of an access door 202 of the magazine mounting device 200. These guide rails can be extended outward from inside the magazine mounting device 200 to ease installation of the magazines 400 and retracted to house them within the photographic processing system 1.

The exposure unit 100 includes a light source 111, a mirror unit 112 for bending a light path from the light source 111 generally at right angles to direct it to an enlarger lens 101, an operator panel 113, a monitor display 114, and an enclosure 120 which covers an enlarger lens unit and shuts out external light.

The developer unit 300 subjects the cut pieces of the printing paper to developing, bleaching, fixing, stabilizing and drying processes as mentioned above. To enable the developer unit 300 to properly perform these processes, it is essential that the cut pieces of the printing paper be kept free of exposure to extraneous stray light at least during the entire developing process and in early stages of the bleaching and fixing processes. For this reason, the developer unit 300 includes at least two sections, that is, a dark chamber section 301 for performing the developing, bleaching, fixing and stabilizing processes and a drying section 302 for carrying out the drying process and associated operation.

Dried pieces of the printing paper, or finished prints, are ejected through a delivery slot 303 provided in an upper part of the developer unit 300 and stacked on a first transfer belt 304. The number of the finished prints thus stacked on the first transfer belt 304 is equal to the number of exposed frames of the film, for example. When the processing of one film has been completed, the stacked prints are transferred by the first transfer belt 304 onto a second transfer belt 305 and held thereon. The second transfer belt 305 can hold stacks of finished prints produced from more than one film.

FIG. 2 shows the construction of the exposure unit 100, the magazine mounting device 200 and the developer unit 300. Referring to FIG. 2, the exposure unit 100 includes, in addition to the aforementioned constituent elements, the earlier-mentioned enlarger lens 101, a filter assembly 102 containing yellow (Y), magenta (M) and cyan (C) filter elements, for instance, a film holder 103 for retaining a film, a mask holder unit 104 for setting a mask of a size chosen from several sizes in position for defining a desired exposure area, and an exposure table 105 including a transfer belt for holding a light-sensitive material (printing paper) 10. It is to be noted that the mirror unit 112 is not illustrated in FIG. 2. In the first embodiment, an exposure surface of the exposure table 105 is disposed generally in a horizontal plane.

The magazines 400 individually accommodate the printing paper 10 rolled on a reel, for example. Each magazine 400 is a generally cube-shaped enclosure having at least a first side wall 401, a second side wall 402, a third side wall 403 and a fourth side wall 404 which are perpendicular to the page of FIG. 2 as well as two more walls which are parallel to the page of FIG. 2. Each of the magazines 400 incorporates in its internal space a reel shaft 405 fitted at right angles to the page of FIG. 2 for rotatably supporting the rolled printing paper 10 and guide rollers 407, 408. The guide rollers 407, for instance, can be turned manually or automatically.

Each magazine 400 has a printing paper outlet 406 for pulling out the printing paper 10 to the exterior near the line where the first side wall 401 intersects the second side wall 402 generally at right angles. The printing paper outlet 406 of each magazine 400 is fitted with a light-shielding lid (not shown) which can be closed and opened to block the light from entering the interior of each magazine 400 when it is taken out of the photographic processing system 1.

In this embodiment, each magazine 400 is constructed such that the distance W1 between the first side wall 401 and the third side wall 403 which are parallel to each other is approximately equal to the distance W2 between the second side wall 402 and the fourth side wall 404 which are parallel to each other. This means that each magazine 400 has a generally square-shaped cross section as viewed along the longitudinal axis of its reel shaft 405. Since W1 is approximately equal to W2 as described above, it is possible to make the distance between the guide rails of a first magazine mounting unit 210 equal to the distance between the guide rails of a second magazine mounting unit 220. Furthermore, since the two magazines 400 have a generally square-shaped cross section, the first magazine mounting unit 210 and the second magazine mounting unit 220 can be made to have the same construction. It is to be noted, however, that the magazines 400 need not necessarily be constructed into the square-shaped cross section but may have a generally rectangular, polygonal or circular shape. What is important for the construction of the magazines 400 is that it should be possible to the mount the two magazines 400 in such a way that their printing paper outlets 406 are oriented in different directions. As can be seen from FIG. 2, each magazine 400 is fitted with handles 409.

The magazine mounting device 200 includes the aforementioned first magazine mounting unit 210 in which the magazine 400 on the left side as illustrated (hereinafter referred to as the first magazine 400A) is housed generally in a vertical position in a manner that its fourth side wall 404 is located on the bottom side, and the aforementioned second magazine mounting unit 220 in which the magazine 400 on the right side as illustrated (hereinafter referred to as the second magazine 400B) is housed generally in a vertical position in a manner that its third side wall 403 is located on the bottom side. This means that the printing paper 10 stored in the first magazine 400A is pulled out generally in a horizontal direction through its printing paper outlet 406 while the printing paper 10 stored in the second magazine 400B is pulled out generally in a vertical direction through its printing paper outlet 406. As already described, the first magazine mounting unit 210 and the second magazine mounting unit 220 includes the respective guide rails (not shown) which are perpendicular to the page of FIG. 2 and the first and second magazines 400A, 400B are mounted on the respective guide rails.

There are provided a drive roller 230 and follower rollers 231 above the printing paper outlet 406 of the second magazine 400B where the distance from the printing paper outlet 406 of the first magazine 400A is approximately equal to the distance from the printing paper outlet 406 of the second magazine 400B. The follower rollers 231 press the printing paper 10 pulled out of the first magazine 400A or the second magazine 400B against the drive roller 230. The drive roller 230 exerts a driving force on the printing paper 10 pulled out of the first magazine 400A or the second magazine 400B to further pull out the printing paper 10 and transfer it toward the exposure table 105 by way of a cutter 201.

There is provided a turn roller 232 between the printing paper outlet 406 of the first magazine 400A and the drive roller 230 for redirecting the printing paper 10 pulled out of the first magazine 400A generally in a horizontal direction to smoothly transfer the printing paper 10. The magazine mounting device 200 may be constructed such that the turn roller 232 rotate in synchronism with the drive roller 230 or to turn following the movement of the printing paper 10.

Guide walls 240 for guiding an unrolled portion of the printing paper 10 pulled out of the first magazine 400A or the second magazine 400B toward the drive roller 230 and the drive roller 230 are provided between the printing paper outlet 406 of the first magazine 400A and the rollers 230, 231 and between the printing paper outlet 406 of the second magazine 400B and the rollers 230, 231.

As is apparent from FIG. 2, the arrangement of the first and second magazine mounting units 210, 220 in the horizontal plane is such that they are situated at a proper distance from each other to ensure that the handles 409 of the first magazine 400A and the second magazine 400B do not come into mutual contact and are so oriented that the first side wall 401 of the first magazine 400A and the second side wall 402 of the second magazine 400B are directed face to face with each other. Also, the first magazine 400A is located at a higher position than the second magazine 400B in the vertical plane. With this arrangement, the first magazine 400A and the second magazine 400B can be positioned in such a way that their printing paper outlets 406 are located close to each other without blocking each other's printing paper outlet 406, and it is possible to minimize the distance from the printing paper outlets 406 of the first and second magazines 400A, 400B to the drive roller 230. As a consequence, it is possible to achieve a high degree of freedom with respect to the location and configuration of the magazine mounting device 200 in the photographic processing system 1 and reduce overall dimensions of the photographic processing system 1.

Operation of the magazine mounting device 200 of the photographic processing system 1 according to the first embodiment is now described below. When installing the first and second magazine mounting units 210, 220, the access door 202 of the photographic processing system 1 is opened and the guide rails of the first and second magazine mounting units 210, 220 are extended outward. Then, the first and second magazines 400A, 400B oriented in the aforementioned directions are mounted on the respective guide rails and pushed into the magazine mounting device 200. The first and second magazines 400A, 400B are mounted in the first and second magazine mounting units 210, 220, respectively, in this manner.

When the first and second magazines 400A, 400B have been set in position as described above, the light-shielding lid (not shown) of the printing paper outlet 406 of one of the magazines 400 (first magazine 400A, for example) is opened manually or automatically and its guide rollers 407 are turned manually or automatically to pay out the printing paper 10 from the first magazine 400A until its outer terminal part reaches the drive roller 230. After the terminal part of the printing paper 10 has been gripped between the drive roller 230 and the follower rollers 231, the printing paper 10 is unrolled out of the first magazine 400A mainly by a pulling force exerted by the drive roller 230.

The unrolled portion of the printing paper 10 is cut into pieces of a specified length and the cut pieces are successively advanced to the exposure table 105. Each piece of the printing paper 10 exposed on the exposure table 105 is then transferred to the developer unit 300 for development and the succeeding processes. When the printing paper 10 in the first magazine 400A been fully used, the light-shielding lid (not shown) of the printing paper outlet 406 of the second magazine 400B is opened and its guide rollers 407 are turned to pay out the printing paper 10 in the first magazine 400A until the terminal part of the printing paper 10 is gripped between the drive roller 230 and the follower rollers 231. Operation thereafter is the same as described above with respect to the first magazine 400A.

The first and second magazines 400A, 400B having the same shape are mounted in different directions as described above in the first embodiment. This construction makes it possible to position the two magazines 400A, 400B in such a way that their printing paper outlets 406 are directed generally at right angles and located close to each other. It is easy to make the distance from the printing paper outlet 406 of the first magazine 400A to the drive roller 230 approximately equal to the distance from the printing paper outlet 406 of the second magazine 400B to the drive roller 230 in the construction of the first embodiment. Furthermore, it is possible to minimize the distance from the printing paper outlets 406 of the first and second magazines 400A, 400B to the drive roller 230 and thereby reduce overall dimensions of the photographic processing system 1.

Second Embodiment

Figure 3:
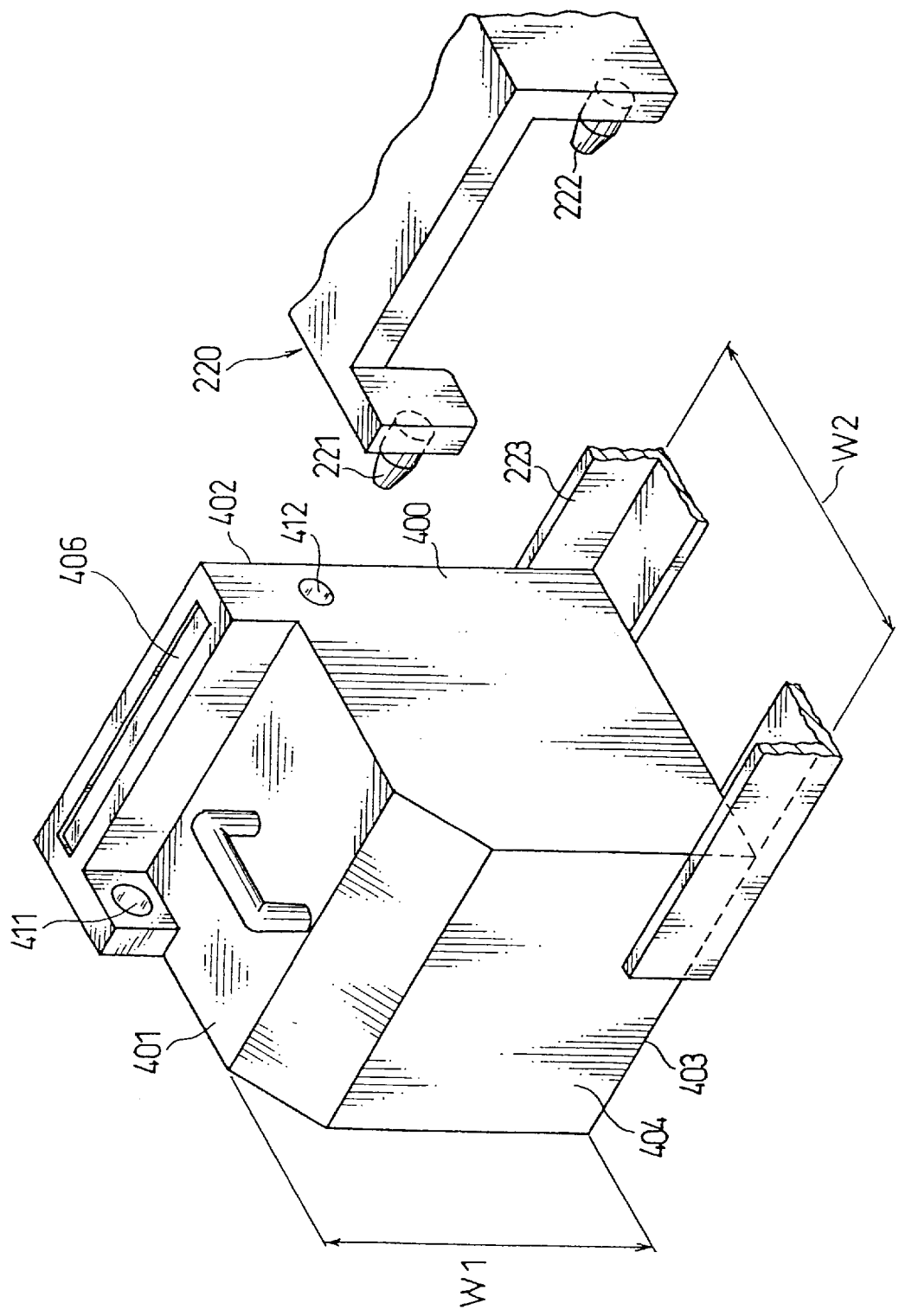
FIG. 3 is a perspective diagram showing the construction of a magazine and a magazine positioning mechanism according to a second embodiment of the invention.
Figure 4:
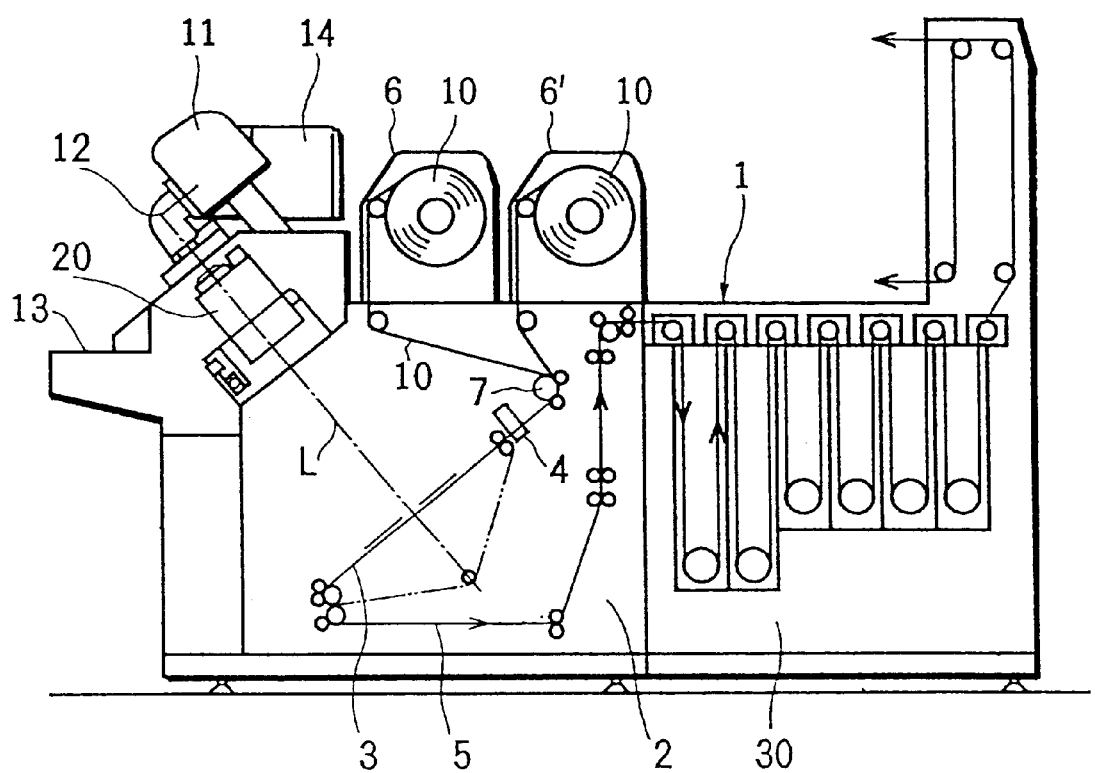
FIG. 4 is a sectional diagram generally showing the construction of a conventional photographic processing system.

A second embodiment of the invention is now described referring to FIG. 3, which is a perspective diagram showing a magazine 400 and a magazine positioning mechanism of a photographic processing system 1 according to the second embodiment of the invention. Since the construction and operation of other parts are the same as shown in the first embodiment, those common parts are not dealt with in the following discussion.

FIG. 3 shows how the magazine 400 is mounted in a second magazine mounting unit 220 of a magazine mounting device 200, for example, in this photographic processing system 1. Specifically, the magazine 400 is mounted on guide rails 223 of the second magazine mounting unit 220 in a manner that a printing paper outlet 406 is directed almost vertically upward. Inside the photographic processing system 1, there are provided positioning pins 221, 222 at an upper part of the second magazine mounting unit 220. On the other hand, there are made fixing holes 411, 412, in which the positioning pins 221, 222 are fitted, in the magazine 400. When the guide rails 223 are retracted into the photographic processing system 1, the positioning pins 221, 222 fit into the fixing holes 411, 412 in the magazine 400, whereby the magazine 400 is secured in position.

Although not illustrated, a magazine 400 to be mounted in a first magazine mounting unit 210 also has similar fixing holes in a direction 90 degrees offset from the fixing holes 411, 412 in the magazine 400 to be mounted in the second magazine mounting unit 220. In one varied form of the second embodiment, the magazine mounting device 200 may be constructed such that the printing paper outlet 406 in the magazine 400 is automatically opened and closed when the positioning pins 221, 222 are fitted into and released from the corresponding fixing holes 411, 412, respectively. In another varied form of the second embodiment, the magazine mounting device 200 may be constructed such that the positioning pins 221, 222 can rotate and mesh with gears or the like provided on the inside of the magazine 400 and guide rollers 407 can be turned from the exterior of the magazine 400 by turning the positioning pins 221, 222 to thereby push out the printing paper 10.

Other Forms of Embodiment

Although the magazine mounting devices 200 of the foregoing embodiments are constructed such that the printing paper 10 in the first magazine 400A is pulled out generally in a horizontal direction and the printing paper 10 in the second magazine 400B is pulled out generally vertically upward, the invention is not limited to this construction. For example, the embodiments may be varied such that the printing paper 10 in the first magazine 400A is pulled out generally in a horizontal direction and the printing paper 10 in the second magazine 400B is pulled out generally vertically downward with the drive roller 230 located below the second magazine 400B. In another form of the invention, at least part of the cross section of each magazine 400, perpendicular to its reel shaft 405, is arc-shaped and, with the arc-shaped portion of each magazine 400 directed to the bottom side, the two magazines 400 are mounted in such a way that their printing paper outlets 406 are oriented in different directions offset by an angle other than 90 degrees. In other words, the difference in the direction of the two printing paper outlets 406 need not necessarily be 90 degrees but what is essential in this invention is that the printing paper outlets 406 of the two magazines 400 be simply oriented in different directions.

Furthermore, although the handles 409 are provided on the first side wall 401 and the second side wall 402 of each magazine 400 in the foregoing embodiments, they may be provided on the third side wall 403 and the fourth side wall 404 of each magazine 400 in the aforementioned form of the invention. In a yet varied form of the invention, the handles 409 may be provided on all the side walls 401–404 in a case where the magazines 400 can be provided in a manner that they do not interfere with one another (if the handles 409 can be provided such that they do not protrude from the side walls 401–404, for example).

Summing up the above descriptions, in one aspect of the invention, a magazine mounting device for a photographic processing system is so constructed that two magazines containing a light-sensitive material and having generally the same shape can be mounted in such a way that light-sensitive material outlets formed in the magazines are oriented in different directions and the distance from the light-sensitive material outlet of one magazine to a drive roller for advancing the light-sensitive material is approximately equal to the distance from the light-sensitive material outlet of the other magazine to the drive roller.

Since the distance from the light-sensitive material outlet of one magazine to the drive roller is substantially the same as that from the light-sensitive material outlet of the other magazine to the drive roller in this construction, it is possible to minimize dead space taken by the magazine mounting device, a light-sensitive material transport mechanism and other associated mechanism in the photographic processing system and thereby reduce its overall dimensions.

In the above construction, the light-sensitive material outlets of the magazines may be oriented generally at right angles to each other.

According to this arrangement, the drive roller can be located at a position close to the point of intersection of a straight line extended horizontally from the light-sensitive material outlet of one magazine and a straight line extended vertically from the light-sensitive material outlet of the other magazine, and this makes it possible to reduce the distance from the light-sensitive material outlet of each magazine to the drive roller.

In the aforementioned construction, the magazine mounting device may be constructed such that each of the magazines includes a reel shaft for holding a roll of the light-sensitive material, a first side wall which is parallel to the reel shaft and has the light-sensitive material outlet formed parallel to the reel shaft and a second side wall which is parallel to the reel shaft and perpendicular to the first side wall, the magazine mounting device comprises a first magazine mount in which one magazine is mounted with its first side wall set generally in a vertical position and a second magazine mount in which the other magazine is mounted with its second side wall set generally in a vertical position.

In this form of construction, it is possible to mount two conventional magazines, whose cross-sectional shape taken at right angles to their reel shafts for holding a rolled light-sensitive material has at least two sides intersecting at right angles to each other, with an angular displacement of 90 degrees. This eliminates the need for preparing new dedicated magazines, enabling an overall cost reduction. Furthermore, this construction permits standardization of magazines with photographic processing systems of different constructions.

Also in the aforementioned construction, the first magazine mount and the second magazine mount may be positioned in such a way that the first side wall of the first magazine mount and the second side wall of the second magazine mount are directed face to face with each other and the magazine mounted in the second magazine mount does not block the light-sensitive material outlet of the magazine mounted in the first magazine mount.

According to this form of construction, the two magazines can be mounted side by side with a small difference in their vertical position and with their light-sensitive material outlets oriented in directions offset by about 90 degrees. This makes it possible to reduce the overall width and height of the magazine mounting device.

In another aspect of the invention, a magazine suited to the aforementioned magazine mounting device comprises a reel shaft for holding a roll of light-sensitive material, a first side wall which is parallel to the reel shaft and has a light-sensitive material outlet formed parallel to the reel shaft, a second side wall which is parallel to the reel shaft and perpendicular to the first side wall, a third side wall parallel to both the reel shaft and the first side wall, and a fourth side wall parallel to both the reel shaft and the second side wall.

The magazine thus constructed can be mounted in the magazine mounting device with any of the first to fourth side walls located on the bottom side and, as a consequence, it is possible to achieve a high degree of freedom with respect to the location and configuration of the magazine mounting device in the photographic processing system and reduce its overall dimensions.

In the aforementioned construction of the magazine mounting device, the distance between the first side wall and the third side wall may be made generally equal to the distance between the second side wall and the fourth side wall.

According to this arrangement, the horizontal width of the magazine mounted in the first magazine mount can be made equal to that of the magazine mounted in the second magazine mount regardless of which of the side walls of each magazine is located on the bottom side. Furthermore, it is even possible to make the first and second magazine mounts to have the same structure. Consequently, it becomes possible to standardize components of the magazine mounting device and achieve its cost reduction.

Also in the aforementioned construction, the magazine may be configured such that the light-sensitive material outlet is provided close to the intersection of the first side wall and the second side wall, and handles are fitted to the first and second side walls, to the third and fourth side walls, or to all the four side walls.

With this arrangement, each magazine can be easily handled by holding the handle fitted to the side wall whichever is in a horizontal position no matter in which each magazine is mounted in the magazine mounting device of the photographic processing system. This serves to increase the degree of freedom in the magazine mounting direction in the magazine mounting device.

While preferred embodiments of the present invention have been particularly shown and described, it will be understood by those skilled in the art that foregoing and other changes in form and details may be made without departing from the sprits and scope of the present invention.

What is claimed is:

1. A magazine mounting device for a photographic processing system comprising:
    a first magazine containing a light-sensitive material therein and formed with a first light-sensitive material outlet;
    a second magazine, having generally the same shape as the first magazine, containing a light-sensitive material therein and formed with a second light-sensitive material outlet; and
    a drive roller for advancing the light-sensitive material from one of said magazines;
    said magazines are positioned such that the first sensitive material outlet and the second light-sensitive material outlet are oriented in different directions; and a distance between the first light-sensitive material outlet and the drive roller is approximately equal to a distance between the second light sensitive material outlet and the drive roller.

2. The magazine mounting device according to claim 1, wherein the light-sensitive material outlets of said magazines are oriented generally at right angles to each other.

3. The magazine mounting device according to claim 1, further comprising:
    a first magazine mount in which the first magazine is mounted; and
    a second magazine mount in which the second magazine is mounted; and
    each of said magazines including:
        a reel shaft for holding a roll of the light sensitive material,
        a first side wall which is parallel to the reel shaft and the light sensitive material outlet formed parallel to the reel shaft and
        a second side wall which is parallel to the reel shaft and perpendicular to the first side wall; and
    wherein the first magazine is mounted in the first magazine mount with the first side wall generally in vertical posture and the second magazine is mounted in the second magazine mount with the second side wall generally in vertical posture.

4. The magazine mounting device according to claim 2, further comprising:
    a first magazine mount in which the first magazine is mounted; and
    a second magazine mount in which the second magazine is mounted; and
    each of said magazines including:
        a reel shaft for holding a roll of the light sensitive material,
        a first side wall which is parallel to the reel shaft and the light sensitive material outlet formed parallel to the reel shaft and
        a second side wall which is parallel to the reel shaft and perpendicular to the first side wall; and
    wherein the first magazine is mounted in the first magazine mount with the first side wall generally in vertical posture and the second magazine is mounted in the second magazine mount with the second side wall generally in vertical posture.

5. The magazine mounting device according to claim 3, wherein said first magazine mount and said second magazine mount are positioned in such a way that the first side wall of said first magazine mount and the second side wall of said second magazine mount are directed face to face with each other and the second magazine mounted in said second magazine mount does not block the first light-sensitive material outlet of the first magazine mounted in said first magazine mount.

6. The magazine mounting device according to claim 4, wherein said first magazine mount and said second magazine mount are positioned in such a way that the first side wall of said first magazine mount and the second side wall of said second magazine mount are directed face to face with each other and the second magazine mounted in said second magazine mount does not block the first light-sensitive material outlet of the first magazine mounted in said first magazine mount.

7. A magazine for a photographic processing system comprising:
    a reel shaft for holding a roll of light-sensitive material;
    a first side wall which is parallel to the reel shaft and has a light-sensitive material outlet formed parallel to the reel shaft;
    a second side wall which is parallel to the reel shaft and perpendicular to the first side wall;
    a third side wall parallel to both the reel shaft and the first side wall; and
    a fourth side wall parallel to both the reel shaft and the second side wall;
    the distance between the first side wall and the third side wall being generally equal to the distance between the second side wall and the fourth side wall;
    the light-sensitive material outlet being provided close to the intersection of the first side wall and the second side wall, and handles are fitted to the first and second side walls, to the third and fourth side walls or to all four side walls.

* * * * *